(12) United States Patent  
Evans (10) Patent No.: US 11,193,474 B1  
(45) Date of Patent: Dec. 7, 2021

(54) AIR POWERED ELECTRIC GENERATOR

(71) Applicant: Bizhub Group LLC, Bay Harbor Island, FL (US)

(72) Inventor: Peter Mark Evans, Bay Harbor Islands, FL (US)

(73) Assignee: Bizhub Group LLC, Bay Harbor Island, FL (US)

( * ) Notice: Subject to any disclaimer, the term of this patent is extended or adjusted under 35 U.S.C. 154(b) by 0 days.

(21) Appl. No.: 17/124,834

(22) Filed: Dec. 17, 2020

Related U.S. Application Data (60) Provisional application No. 62/950,516, filed on Dec. 19, 2019.

(51) Int. Cl.
| | |
|---|---|
| *F03D 9/25* | (2016.01) |
| *H02K 7/02* | (2006.01) |
| *H02K 7/18* | (2006.01) |
| *H02K 21/24* | (2006.01) |

(52) U.S. Cl.
CPC .............. *F03D 9/255* (2017.02); *H02K 7/02* (2013.01); *H02K 7/1823* (2013.01); *H02K 21/24* (2013.01)

(58) Field of Classification Search
CPC ...... F03D 9/255; H02K 21/24; H02K 7/1823; H02K 7/02
See application file for complete search history.

(56) References Cited

U.S. PATENT DOCUMENTS

| | | | |
|---|---|---|---|
| 6,922,004 B2 | 7/2005 | Hashimoto et al. | |
| 7,557,482 B2 | 7/2009 | Aydin et al. | |
| 2005/0189772 A1* | 9/2005 | Gozdawa | F01D 25/12 |
| | | | 290/52 |
| 2012/0309575 A1 | 12/2012 | Buffet | |
| 2017/0151954 A1 | 6/2017 | Hilton | |
| 2018/0163738 A1* | 6/2018 | Merritt | F04D 29/051 |

FOREIGN PATENT DOCUMENTS

| | | |
|---|---|---|
| EP | 3160782 | 5/2017 |
| WO | 2004/047255 A2 | 6/2004 |

* cited by examiner

*Primary Examiner* — Tulsidas C Patel  
*Assistant Examiner* — Joseph Ortega  
(74) *Attorney, Agent, or Firm* — The Concept Law Group, P.A.; Robert C. Kain (57) ABSTRACT

Air powered electrical generator (APEG) motive parts are mounted on an axle carrying bilateral air turbines and two intermediate rotor subassemblies. Circular rotor blade plates have scalene triangularly shaped cavities with long leading edge sides receiving compressed air flow, short trailing edge sides and an open peripheral air portal. Adjacently mounted blades are offset such that one air portal then another air portal is presented to compressed air flow from nozzles during rotation. Each turbine shroud has a manifold feeding compressed air to the nozzle, as a venturi, due alternating presented air portals. Each rotor carries permanent magnets on its radially outboard segments. Bilateral stationary stators are transversely fixedly mounted outboard of the rotating rotor subassemblies. Electrical outputs carry power from the stators when the rotor subassemblies rotate.

12 Claims, 10 Drawing Sheets

AIR POWERED ELECTRIC GENERATOR

CROSS-REFERENCE TO RELATED APPLICATION

This application claims priority to U.S. Provisional Patent Application Ser. No. 62/950,516, filed, Dec. 19, 2019, the entirety of which is incorporated by reference.

FIELD OF THE INVENTION

The present invention relates to an air powered electrical generator (APEG) using aero-kinetic technology deployed in an electrical generator wherein air turbines, combined with a flywheel carrying magnets, produce electrical energy when the air moves the flywheel magnets past the windings of the stator. The result is an air powered electrical generator to produce multiple single or multiple three-phase AC power. The APEG can be connected to electric motors, electrical transmission and distribution systems and anything needing electric power.

BACKGROUND OF THE INVENTION

Certain prior art machines, such as axial flux machines (also referred to as axial gap, disk, or pancake motors and generators), kinetic energy recovery system (KERS) and flywheel technology, are known. Also, air intake turbines, based both centrifugal and axial fan technology, are known.

Notwithstanding these prior art electric generators, it is the intention of the inventor to prove that there is a better way to generate electricity using the air powered electrical generator. All current electrical generators require an external use of another form of energy source to cause the generation of power to occur, including but not limited to, generators powered by solar power, wind power, turbines powered by water, steam or combustion engines. Some require a vacuum chamber to be more efficient as in some KERS and flywheel-based energy storage devises.

U.S. Pat. No. 6,922,004 relates to an axial flux motor assembly. The power unit assembly has a pair of mirrored axial flux electric motors having a common axis of rotation, each axial flux motor including a rotor disposed on a rotor shaft and at least one stator disposed in operative relationship to said rotor. A common end plate is disposed between each of the pair of axial flux electric motors to provide a common mounting structure, while an output hub is operatively coupled to each rotor shaft of the pair of mirrored axial flux electric motors. Each of the pair of mirrored axial flux electric motors is operatively configured to provide independent speed and torque to each associated output hub.

European patent publication 3160782 discloses methods of controlling kinetic energy recovery systems (KERS). The system includes controllers, drivetrains and vehicles comprising the KERS and controllers. The KERS includes an energy storage system. In an embodiment, a vehicle is provided with a first vehicle operating mode (VOM1) wherein the energy storage system has a first target state of charge (TSOC1), and with a second vehicle operating mode (VOM2) wherein the energy storage system has a second target state of charge (TSOC2). The first or second vehicle operating mode is selected and energy is transferred between the energy storage system and the vehicle in order to achieve the target state of charge associated with the selected vehicle operating mode. In another embodiments, the KERS comprises a variable power transmission device adapted to transfer energy to and from the energy storage system. The energy storage system is maintained at suitable energy levels for the vehicle's driving conditions U.S. Pat. No. 7,557,482 relates to a power unit assembly and includes a pair of mirrored axial flux electric motors having a common axis of rotation, each axial flux motor including a rotor disposed on a rotor shaft and at least one stator disposed in operative relationship to said rotor. A common end plate is disposed between each of said pair of axial flux electric motors to provide a common mounting structure, while an output hub is operatively coupled to each rotor shaft of the pair of mirrored axial flux electric motors. Each of the pair of mirrored axial flux electric motors is operatively configured to provide independent speed and torque to each associated output hub.

US Patent publication no. 20120309575 discloses a flywheel to recover kinetic energy for hybrid vehicle which has two planetary gears mechanisms for power derivation. The disclosure relates to a hybrid vehicle which uses two planetary gears mechanisms for its power derivation, one dedicated to the vehicle low speeds and the second dedicated to the vehicle high-speeds. To improve this device, a small flywheel, less than 1% of the vehicle weight, is coupled to the generator to store the kinetic energy of the vehicle during deceleration. The double planetary gears mechanism makes possible to have, a high effectiveness at vehicle low speeds where the decelerations are frequent and little effect at vehicle high speed where the decelerations are less frequent, where they are often too powerful for the existing devices and where we should not harm the vehicle inertia.

Therefore, a need exists to overcome the problems with the prior art as discussed above.

SUMMARY OF THE INVENTION

The invention provides an air powered electrical generator (APEG) that overcomes the hereinafore-mentioned disadvantages of the heretofore-known devices and methods of this general type.

The APEG invention provides a new type of electric generator based on the axial flux technology, with centrifugal/axial fan air turbines, rotor assemblies with permanent magnet segments and stators. The rotor assembly has, among other things, multiple rotors, blades and magnets. The centrifugal air turbines are configured as shroud air manifolds forming a turbine which drives the rotor assembly. The stator includes individually wound coils that will conduct the electrical current and a housing made of a non-metallic material. The invention combines internal air compression and pneumatic cycles employed to take advantage of the turbine effect. The invention can be used in pneumatic and hydraulic operations as a replacement for combustion powered gas generators.

With the foregoing and other objects in view, there is provided, in accordance with the invention, an air powered electrical generator (APEG) which includes a rotating axle upon which is mounted bilateral air turbines on opposite sides of an APEG centerline normal to the axle; at least two rotor subassemblies mounted on the axle inboard of the bilateral turbines; each rotor subassembly having at least two cavity carrying circular blade plates mounted adjacent each other; a plurality of cavities formed in each blade plate, each cavity having a substantially scalene triangular shape formed by a longer air impact leading edge and a shorter trailing edge and an air portal open at a periphery of the blade plate; each blade plate in each rotor subassembly offset to another blade plate of the at least two blade plates such that at least one air portal is present about the periphery of the mounted blade plates during rotation of the rotor subassemblies on the axle; each turbine having a shroud and turbine blades generating compressed air flow into a manifold; at least one venturi nozzle mounted at both manifold outputs channeling the compressed air flow into presented air portal; each rotor subassembly carrying a plurality of permanent magnets on and about radially outboard blade segments of the blade plates; at least two bilateral stationary stators transversely fixedly mounted separate and apart from the rotating axle outboard of the rotating rotor subassemblies; and electrical outputs electrically coupled to the stators carrying APEG generated electric power from the stators when the rotor subassemblies rotate with respect to the stationary stators.

In accordance with another feature, an embodiment of the APEG includes, in the generally triangularly shaped blade cavities, an intersection of the leading edge of the cavity forming a substantially acute angle to the trailing edge. The hypotenuse of the triangular shape cavity is radially inboard of the blade periphery.

An additional feature of the APEG has the substantially triangular cavities extending radially inboard of the magnets on and about the radially outboard blade segments of the blade plates, thereby forming a flywheel.

A further feature of the APEG includes the two rotor subassemblies which form a rotor assembly with an intermediate circular center plate mounted on the axle. The center plate carries the magnets and the magnets transversely extend through passages in each blade plate on the radially outboard blade segments.

Another aspect of the APEG includes circular end cap plates transversely outboard each of the rotor subassemblies. Each end cap plate is formed by alternating wedges of positive and negative magnetic plates. These alternating wedges of positive and negative magnetic plates are in magnetic alignment with blade carried magnets.

A further aspect of the APEG includes the feature that each turbine shroud has a first upper flow manifold and a second lower flow manifold. The upper nozzle is fed with compressed air from the upper flow manifold of the bilateral turbines. The lower flow manifold feeds compressed air from the lower flow manifold to a lower venturi nozzle. In this manner, the presented air portal for one blade plate is open to the upper nozzle simultaneous with the presented air portal for other blade plate being open to the lower nozzle.

An additional enhancement of the APEG includes an air starter pump feeding starting compressed air into the venturi nozzle. The starter compressed air pump may be supplied electrical power by a rechargeable battery.

Although the invention is illustrated and described herein as embodied in an air powered electrical generator (APEG), it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "outboard," "inboard," "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, (a) directional indicators of parts or APEG components are referenced to the common axle of the APEG upon which the bilateral air turbine fans and the rotor assembly is mounted; (b) the term "bilateral" refers to two components or assemblies which are on opposite sides of the APEG centerline (e.g., the bilateral rotor subassemblies and the bilateral air turbines), which imaginary centerline is normal to the APEG axle and extends through the centerplate of the rotor assembly; (c) the term "transverse" refers to items to the left and to the right of the APEG centerline; (d) the term "front" or "forward" should be understood to mean components on one side of the APEG axle, such as the upper venturi nozzle is forward the APEG axle compared to the APEG starter air pump and rechargeable battery which is "rearward" of the upper nozzle; and (e) the term "up" refers to items above the APEG axle stand and typically that term "up" or "above" is mentioned in connection with another APEG component ("down," "downward," and "below" being opposite the upward referenced item). The term "peripheral" refers to items father away from the axis of rotation of the referenced component. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4A shows the position of each part and how two multi-chamber offset rotor plates are separated by a center plate. The sandwiched rotor assemblies house six permanent magnets which are capped with magnetic endplates on each side (the mounted rotors carrying a total 12 magnets), together defining the rotor assembly.

FIG. 8 also diagrammatically illustrates the linkage of positive and negative outputs to other stator coils.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention relates to an air powered electrical generator (APEG) 10 using aero-kinetic technology, air turbines, and flywheels.

Figure 1:
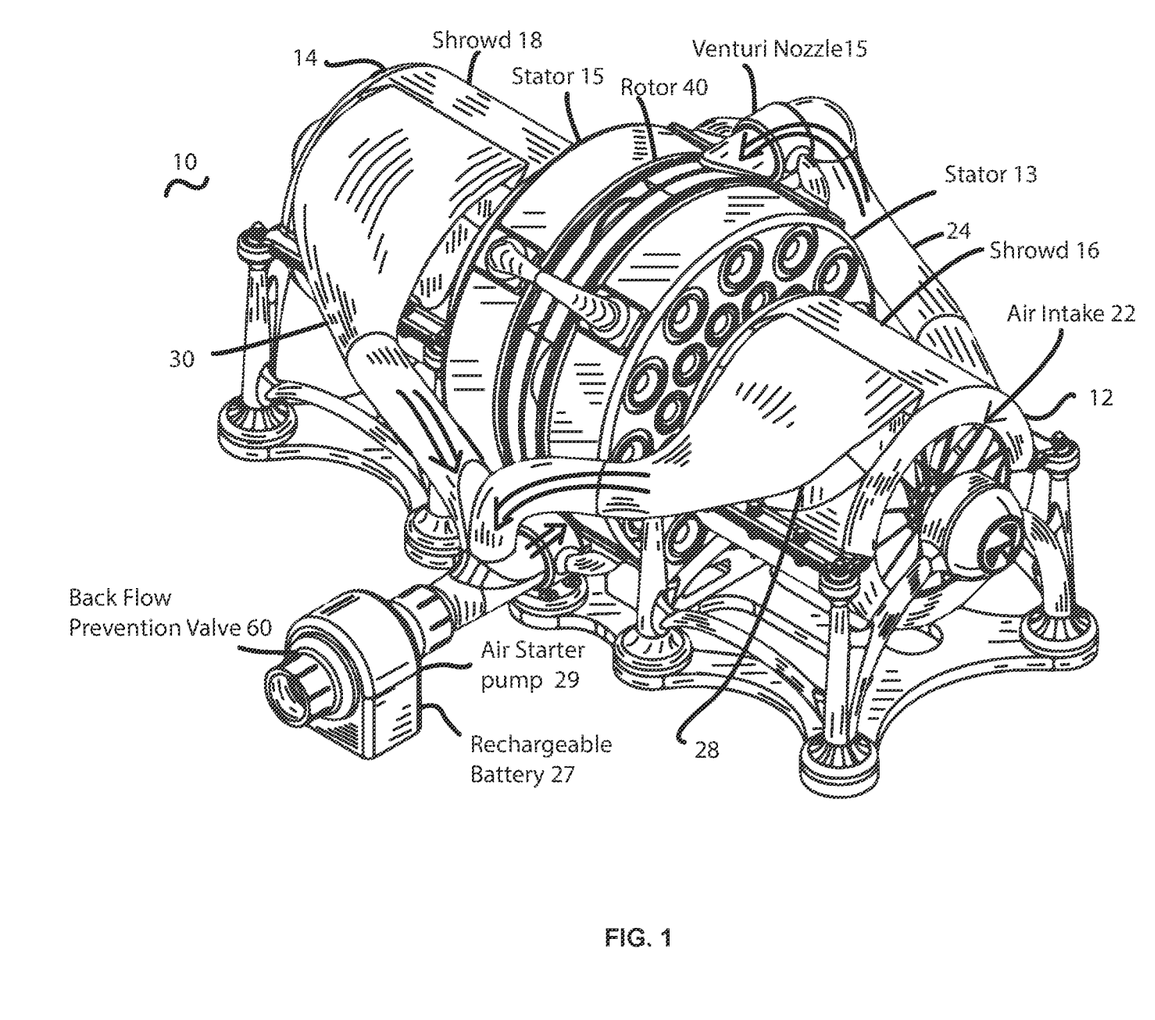
FIG. 1 diagrammatically illustrates a perspective view of the air powered electrical power generator system (APEG) showing air stream regulators (sometimes referred to herein as venturi nozzles) that are positioned on the top and bottom air manifolds.

Referring now to FIG. 1, one embodiment of the present invention is shown in a perspective view of the air powered electrical power generator system (APEG) showing air stream regulators (sometimes referred to herein as venturi nozzles) that are positioned on the top and bottom air manifolds. The Figures show several advantageous features of the present invention, but, as will be described below, the invention can be provided in several shapes, sizes, combinations of features and components, and varying numbers and functions of the components.

Figure 2:
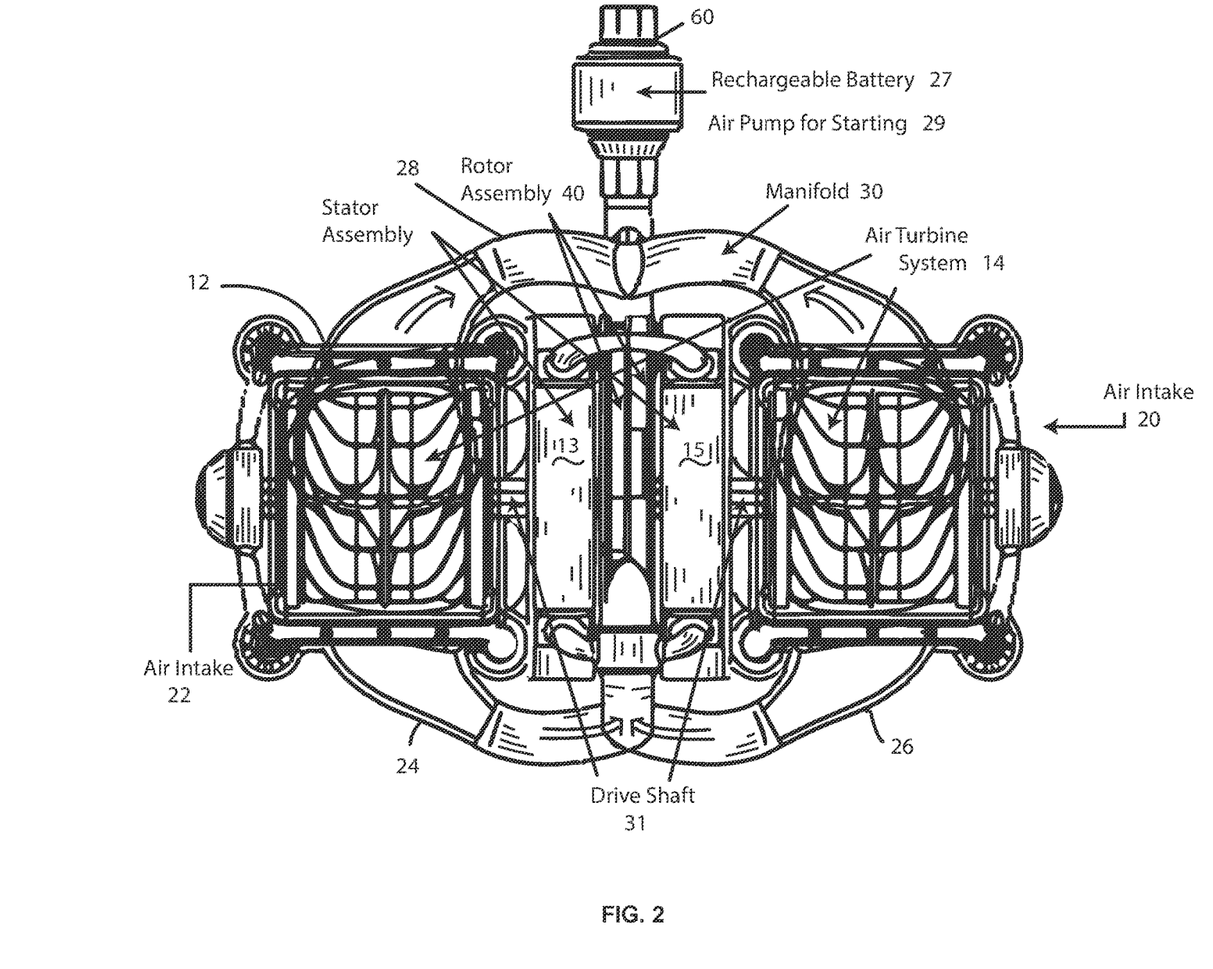
FIG. 2 diagrammatically illustrates a partial, cut-away view of the bi-lateral turbine systems and the intermediate pair of stators and the centrally located, bi-lateral rotor assemblies (the rotors being driven by the turbines on a common axle).
Figure 4A:
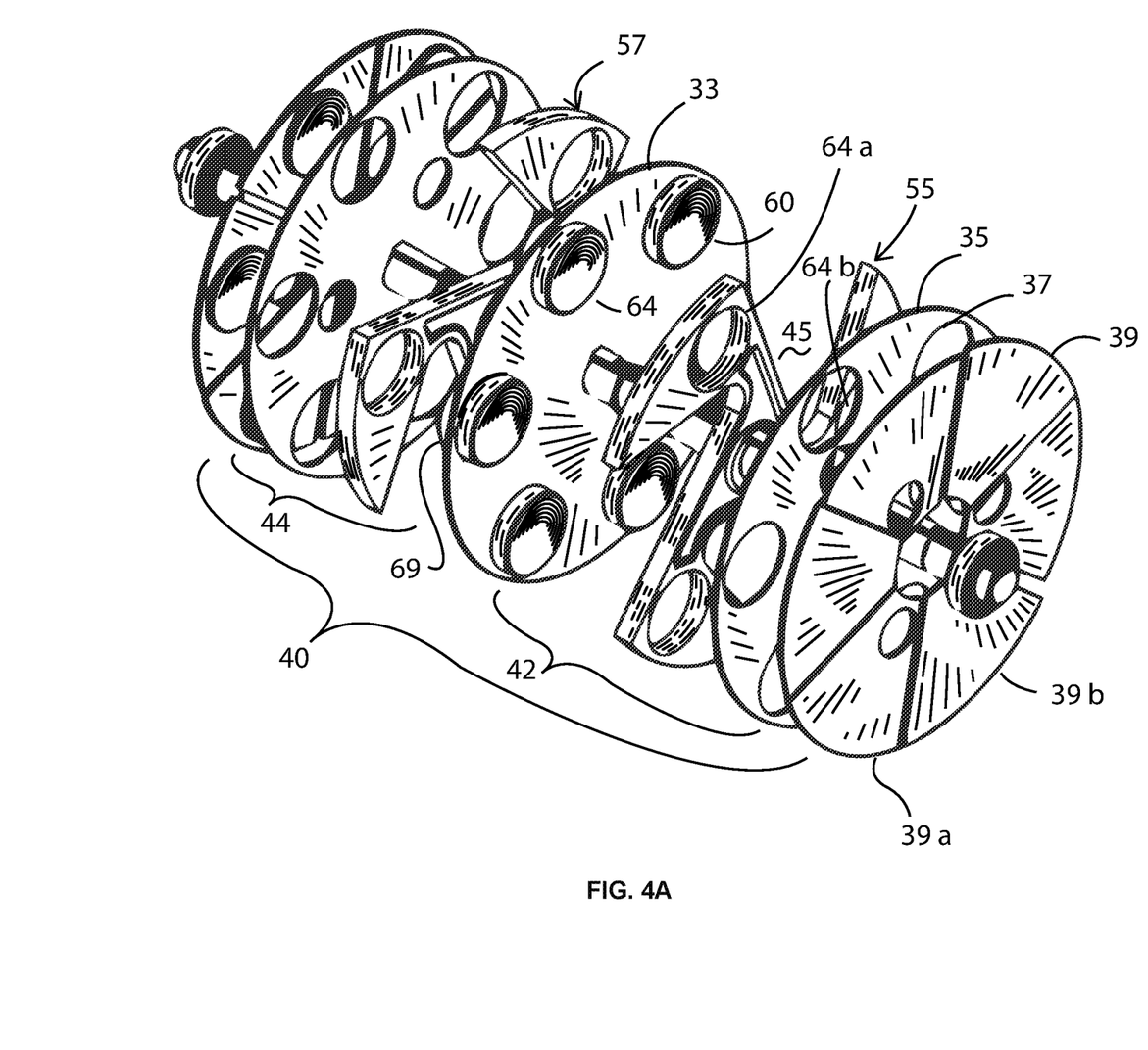
FIG. 4A diagrammatically illustrates an exploded view of the rotor assembly with two rotor blades having the uniquely shaped air chamber cavities and air-admission ports, each cavity carrying blade sandwiched between a magnet carrying plate and a cap plate (the magnets extending from the magnet carrying plate and a cap plate) and at least one end plate.
Figure 4B:
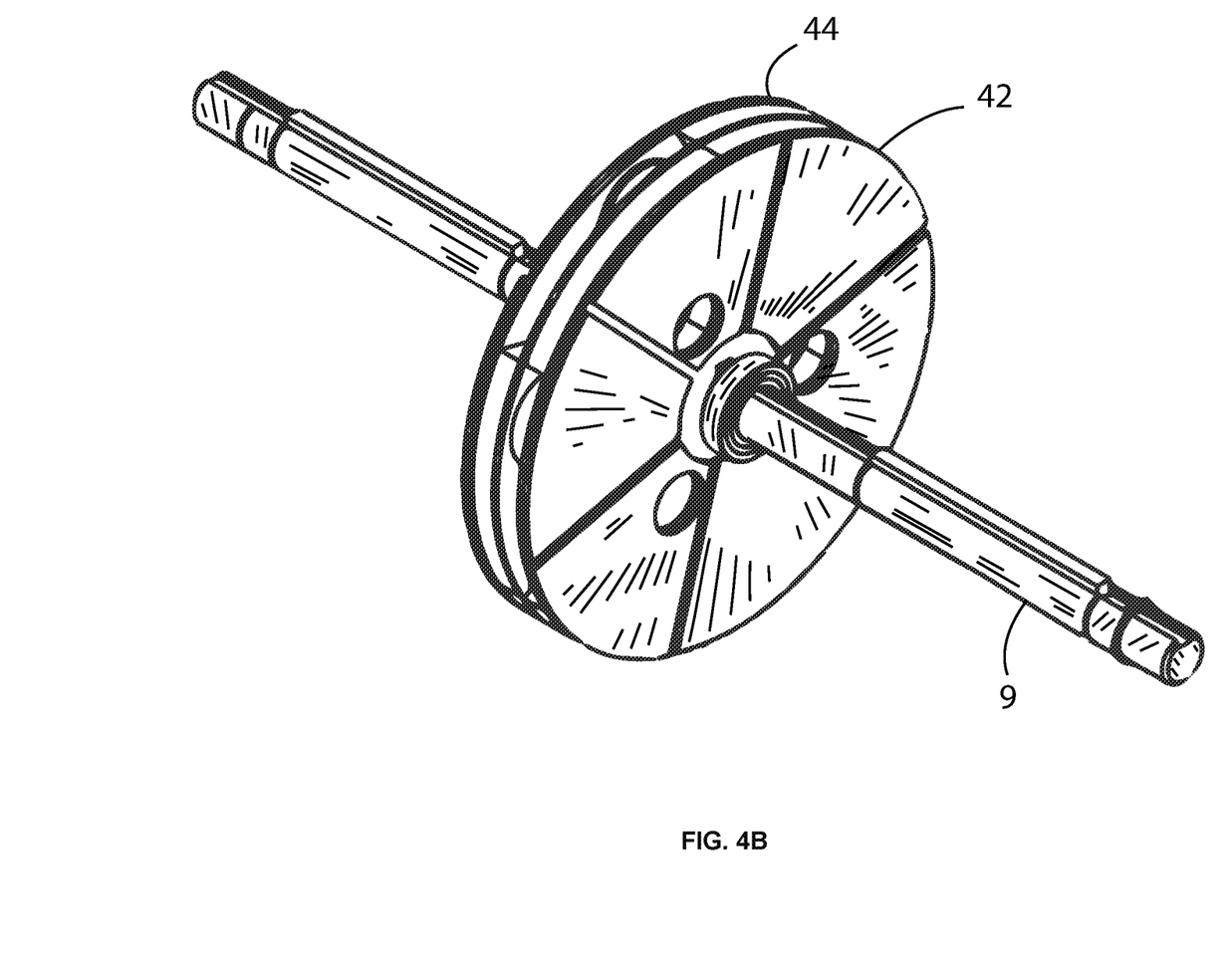
FIG. 4B diagrammatically illustrates the rotor assembly and how two air chamber defining rotor blades (one chambered rotor blade offset from the adjacent chambered rotor blade) and separated by a center plate.
Figure 5:
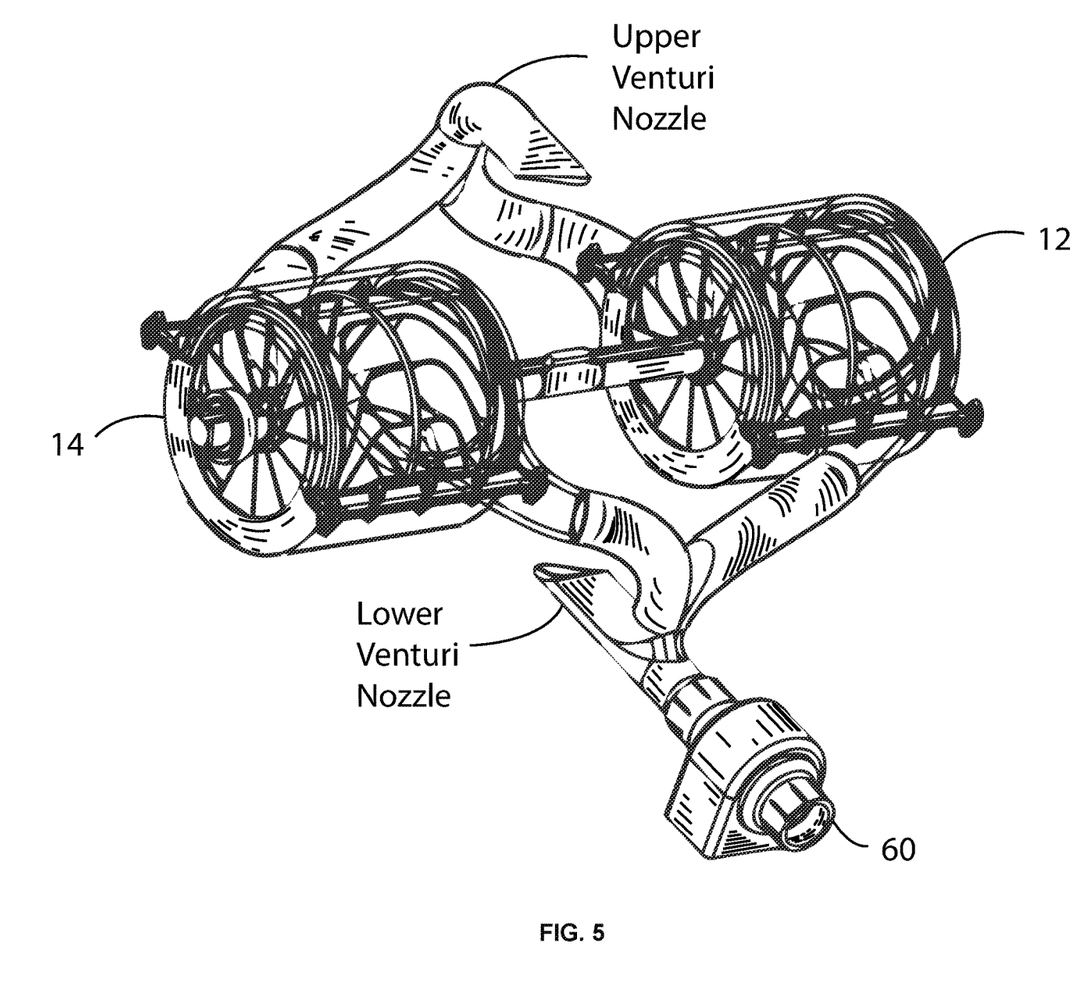
FIG. 5 diagrammatically illustrates the bi-lateral centrifugal air turbines, each respectively encased in a shroud with respective inlets and outlets (the outlets being on opposing side ends of the APEG), the turbines being fixed on a common drive shaft, such that the air is forced through the air manifolds to the rotor air-admission ports and into the associated air chamber cavities.

In summary in FIGS. 1, 2 and 5, two mirrored air turbines 12, 14, (airflow can also be done with a single air turbine or air funnel systems) are encased in a respective shroud 16, 18, each having an air inlet 20, 22 and primary and secondary outlet manifolds 24, 26 (primary or upper) and 28, 30 (secondary or lower). The air turbines are fed with two air transfer manifolds, a primary or upper manifold system 24, 26 and a lower, secondary manifold system 28, 30. A rotor assembly 40 (FIGS. 1, 2 and 4A), driven by the turbines 12, 14, is configured as a flywheel and carries permanent magnets. The rotor 40 assembly consists of two rotor subassemblies 42, 44 having peripheral segments with air chamber cavities (see cavity 45 in FIG. 4A) in the form of a multiple offset hexagrams. Each rotor blade forming air chambers or cavities is separated by the center plate then sandwiched between two plates and each rotor subassembly housing carries six permanent magnets and 12 magnetic plates. Two stators house multiple copper coils, for the example 24 Cu coils are used, 12 large Cu coils and 12 small Cu coils. The turbines and rotor assembly are fixed on a common drive shaft or axle and the rotors rotate within the stator which is fixed to the APEG stand. The two bilateral stationary stators 13, 16 (FIG. 2) are transversely fixedly mounted separate and apart from the rotating axle (see FIG. 4B for axle 9 carrying rotor subassemblies 42, 44) and bilateral stationary stators 13, 16 are outboard of the rotating rotor subassemblies 42, 44.

Electrical outputs are electrically coupled to the stators carrying APEG generated electric power from the stators when the rotor subassemblies rotate with respect to the stationary stators.

In summary in operation, when air under pressure is fed into the backflow prevention valve 60, the air flow acts upon the rotor blade air chambers and forces the rotor assembly to rotate. This causes the air turbines to rotate sucking air into the shroud 16, 18 through the two bilateral inlets 12, 14. The incoming air is further compressed by the turbine blades 70 (FIG. 6) and forced through the air transfer manifolds (primary manifolds 24, 26), which impacts against the longer edge 80 (the leading edge) of air cavity or chamber 81 (FIG. 7) in the rotor and drives the rotor assembly to rotate vigorously. The rotors and turbines are fixed on the same drive shaft axle and the end bearings are suspended between two stationary stator-coil housings that also houses ball bearings or the like.

An example of the industrial application is a simple but effective advancement over existing electric generators. The present invention offers significant advantages over the current electric generators, whether reciprocating or rotary.

The air powered electrical generator is a new method of assemblage of two known types of technologies to produce three-phase alternating currents (AC) power. It incorporates a novel design of rotor with multiple cavities and most of the weight on the outside edge of the rotor subassembly is similar to a flywheel creating the torque needed to rotate a novel design of air turbine.

A rechargeable battery 27 powers an electric air pump 29 is used to start the system and is also used to maintain the rotation of the whole process. For example, the air pump restarts if revolutions per minute (RPM) goes below the usable RPM.

Figure 7:
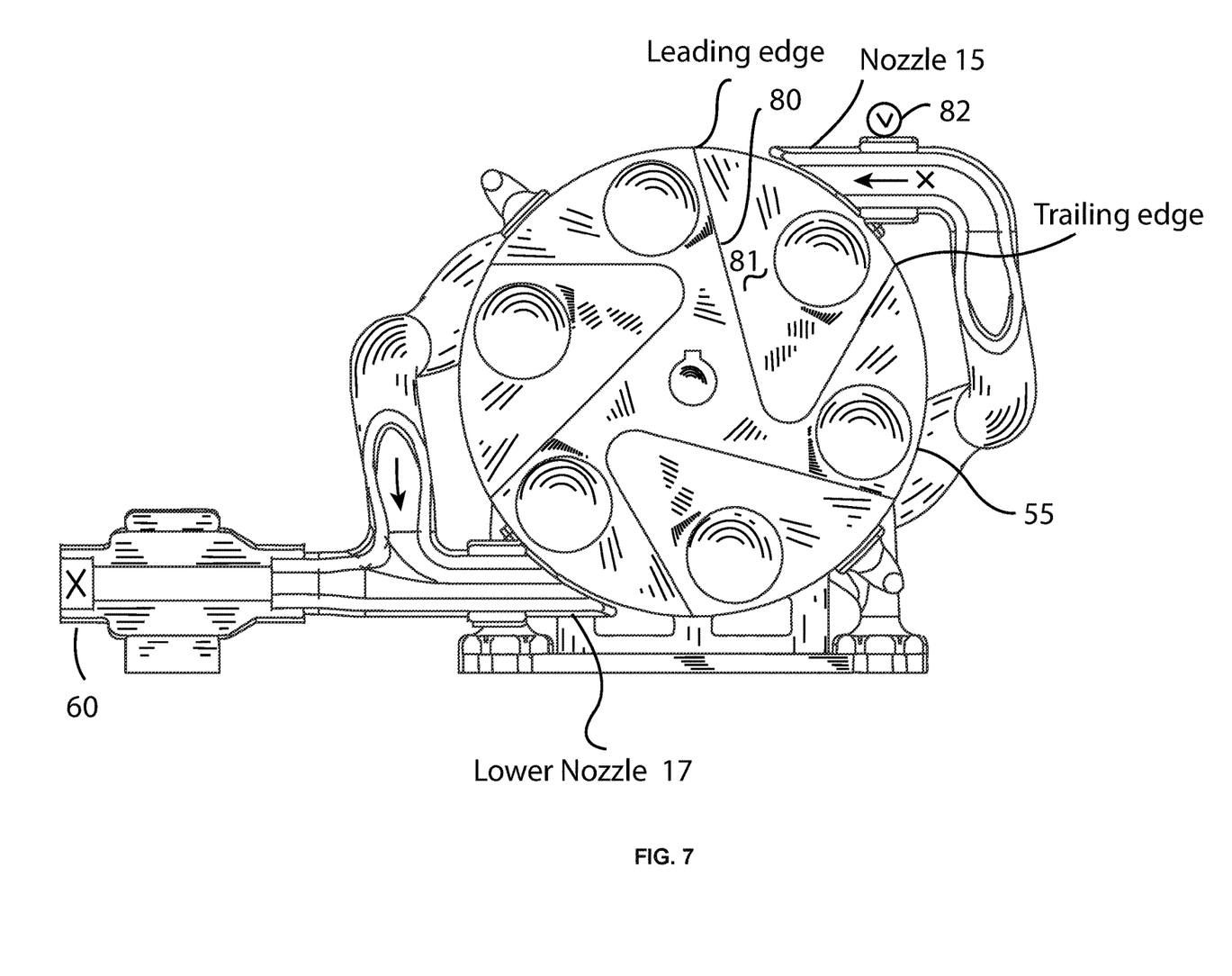
FIG. 7 diagrammatically illustrates each rotor plate air-admission port and the associated rotor air chamber cavity.

There are two known types of technologies that are combined by use of a common drive shaft, the first is the uniquely designed centrifugal air turbines 12, 14 that suck in air, compress it into a high-pressure air stream, forcing the stream through primary air manifolds 24, 26 and venturi nozzles (see primary or upper nozzle 15 (FIGS. 1 and 7) and secondary or lower nozzle 17 in FIG. 7), causing the rotors of the second technology, an axial flux generator, whose novel rotors are designed with air cavities or chambers, such that when the air stream forced into the cavities (see cavity 81, FIG. 7), it creates the inertia/torque similar to flywheel type technology, in turn rotating a positive and negative magnetic field interaction between the magnet carrying rotors 40 (FIG. 4A) and the fixed stators 13, 15 creating an electric current to flow in the stator coils.

The size of the electrical generator and or individual components which includes width, breadth, length, height and diameter can be varied to suit the application it is to be used for. The air powered electrical generator or APEG's individual components are not restricted in the amount of applications it or what they can be used for. It can be attached to water pumps and compressors and used to propel automobiles, aircraft, watercraft and many other forms of transportation, as well as powering both domestic and commercial buildings. Since the APEG uses no harmful fuel it should be regarded as eco-friendly and a more efficient substitute for existing electric generators.

Other rotor assembly designs can be achieved using other or similar designs of open recesses in the rotor blades or air chambers having vanes or impellers therein.

The design of the bilateral centrifugal air turbine is new even though there are many centrifugal pumps available. Prior art or previous designs need to be attached to an electric motor or combustion using exhaust gases or a water turbine for continues operation.

The inventive centrifugal air turbine can also be used on its own for a multiple of uses where a direct high-pressure air or water stream is needed for both inhaling or exhaling of air/water, e.g., for garden blowers and vacuum cleaners water pumps and impellers.

The invention offers simplicity in manufacturing and includes various sizes needed for various power voltage, watts and amperage output and can be made from any suitable materials as set out in the scientific periodic table and compounds mixed from it, e.g. metals and or alloys and other man made materials that will be able to withstand both low and high temperatures also low and high air pressure, for example all derivatives of steel, aluminum, titanium, plastics, carbon and glass fibers and the manufacturing of the air powered electrical generator is not restricted to just these materials.

The rotors and stators stated previously can be modified to be used without the turbines and can incorporate other forms of funnels and the like to direct an airstream or waterflow to rotate the rotors.

FIG. 2 is a top view showing the relationship between the bilateral air turbine system 12, 14, rotor assembly 40 and bilateral stators 13, 15. The drive shaft 31 goes through these three subassemblies components of the APEG. The two bilateral stationary stators 13, 15 are transversely fixedly mounted separate and apart from the rotating axle 9 and are outboard of the rotating rotor subassemblies 42, 44. The APEG has a turbine shroud 16, 18 (FIGS. 1, 2) and has a first upper flow manifold 24 and a second lower flow manifold 28. An upper nozzle 15 is fed with compressed air from the upper flow manifold 24 of each bilateral turbine (see FIG. 1), and the lower flow manifold 28,30 feeds compressed air from the lower flow manifold 28, 30 to a lower venturi nozzle (FIG. 5 shows the lower nozzle, FIG. 1 shows the lower flow manifolds), such that the presented air portal 50 for one blade plate 55 (see FIG. 3) is open to the upper nozzle 15 simultaneously with the presented air portal for other blade plate 57 being open to the lower nozzle (see FIG. 3).

Figure 3:
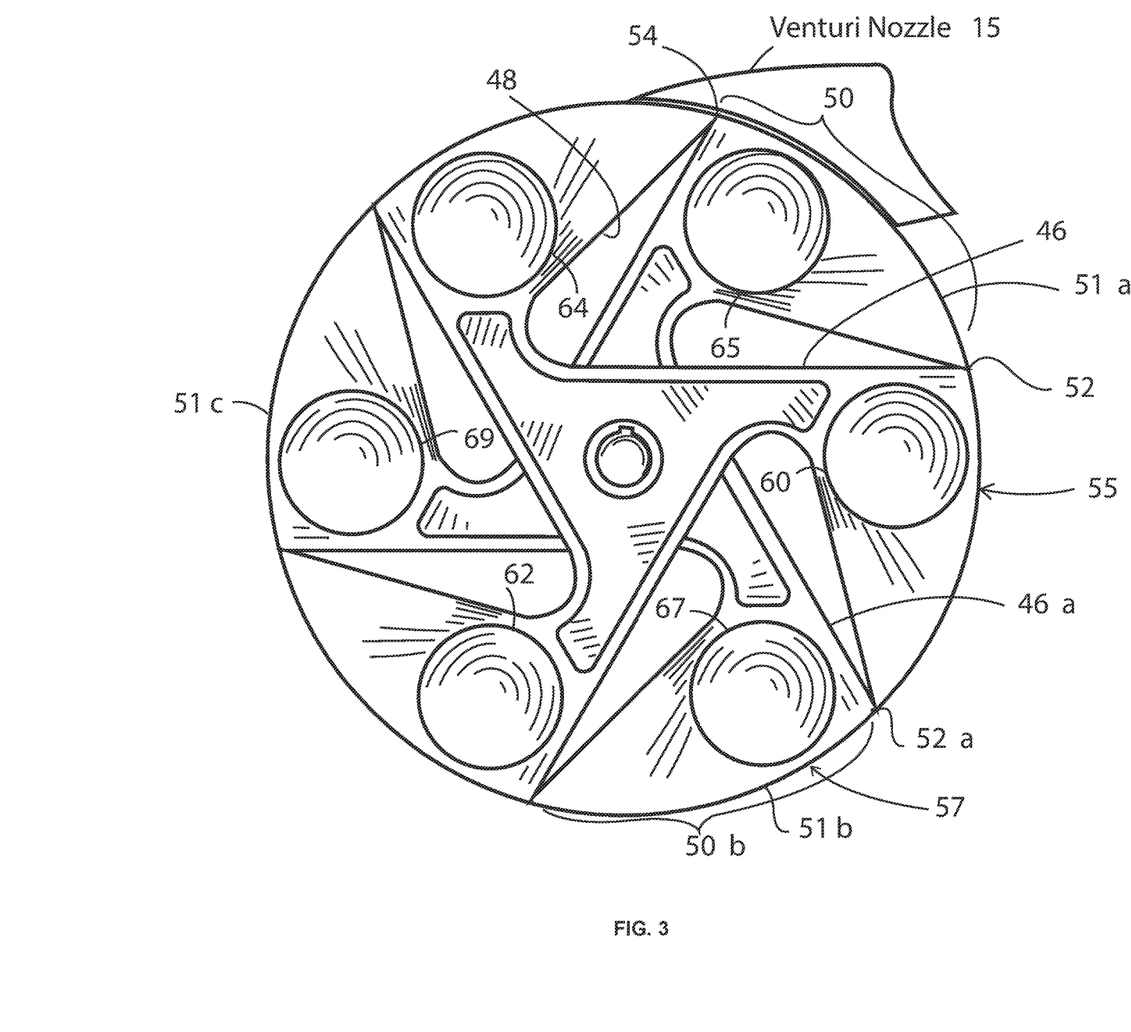
FIG. 3 is a diagrammatic representation of the evolution of the rotor design for the APEG rotor blades (derived from two hexagrams) wherein each rotor plate has three air chamber cavities and air-admission ports (these air-admission ports diagrammatically illustrated in FIG. 7), and wherein each rotor plate is offset from the adjacent plate to control airflow impacting the three air chamber cavities. The rotor shapes can be altered by rounding off the sharper ends (at the nearly 90 degree leading edge and the trailing blade end of each rotor plate).

FIG. 3 diagrammatically illustrates the preferred shape of each rotor recess or air chamber/cavity formed on the cavity forming rotor blade, which shape is an area bounded by (i) air-chamber portal 50, (ii) longer edge 46 (the leading edge point 52 establishing the transition between portal 50 and longer edge 46), and (iii) shorter edge 48 (the trailing edge point 54 at the transition between portal 50 and shorter edge 48). The shape in cavity forming rotor blade space 45 (FIG. 4A) is derived from using multiple hexagram shapes as a guide. Two hexagrams are used offset to provide the necessary angles to shape the rotor cavity in FIG. 3. The rotor cavity shapes 45 can be altered by rounding off the sharper ends (at the nearly 90 degree at leading edge point 52 and the longer edge 46 and the trailing, shorter blade end 48).

A plurality of cavities is formed in each blade plate 55, 57. Each cavity has a substantially scalene triangular shape formed by a longer air impact leading cavity-defining edge 46 and a shorter cavity-defining trailing edge 48 and an air portal 50 open at a periphery of the blade plate. The intersection of the leading edge 46 of the cavity forms a substantially acute angle to the trailing edge 48 and a hypotenuse (not shown) of the triangular shape is radially inboard of the blade periphery.

FIG. 3 shows two cavity carrying rotor blades 55, 57 (note that cavity blade 55 has air portal 50 open to venturi nozzle 15) offset by 60° to alternate the cavities to the air stream from nozzle 15 maintaining a constant airflow first on cavity blade 55 and then, when the rotor rotates 60 degrees, to the air portal 51*b* on cavity blade 57. Stated otherwise, the air portal 50 for cavity blade 55 is immediately adjacent the outer arcuate segment 51*a* of cavity blade 57. The outer arcuate segments 51*a*, 51*b* and 51*c* form the periphery of cavity blade 57 and partly close the output port of the venturi nozzle 15 at the same time, simultaneously, as the presentation of the air-chamber ports, one of which is air portal 50 between edge points 52, 54 of cavity blade 55. When portal 50*b* is presented to the output of nozzle 15, outer arcuate edge 51*b* partly blocks the nozzle output. These leading and trailing edge points (for example, points 52, 54) may be rounded in an alternative design, however, the cavity blades are offset such that only one air portal is presented to the output of nozzle 15 at any one time.

Each blade plate 55, 57 in each rotor subassembly 42, 44 is offset, one blade to another adjacent blade (see, for example, plates 55, 57 in FIG. 3), such that at least one air portal 50 is present and open to upper nozzle 15, about the periphery of the mounted blade plates during rotation of the rotor subassemblies on the axle. Simultaneous with the presentation of air portal 50 to upper nozzle 15, the other air portal of the adjacent blade 57 (blade 57 being shown below blade 55) is open to the lower nozzle compressed air flow. Stated otherwise, the nozzles are 180 degrees opposing each other and the "open-to-nozzle air portals" of adjacent blades are also 180 degrees opposing each other. Therefore, the simultaneous upper and lower compressed air flow effects and pushes the leading longer edges of adjacent blade plates at the same time. The "venturi nozzle effect" is created by the one-at-a-time presentation of an air portal to the corresponding nozzle output. The nozzles mounted at both manifold outputs channel the compressed air flow into presented air portal.

FIG. 3 shows the placement of the permanent magnets 60, 62, 64 on cavity blade 55 and magnets 65, 67, 69 on cavity blade 57. Each rotor subassembly carries a plurality of permanent magnets on and about radially outboard blade segments of the blade plates. See FIG. 3 wherein the magnets are mounted on and about the blades and are radially outboard of the center axle of the APEG.

FIG. 4A is an exploded view of the rotor assembly 40, consisting of rotor subassemblies 42 and 44. Subassembly 42 included a series of peripherally mounted magnets, such as magnets 60, 64, mounted on center plate 33. Center plate 33 has magnets mounted in a peripheral region on both sides of the plate, such that magnet 60 is on one side forming rotor subassembly 42, and magnet 69 is mounted on the opposite side, forming rotor subassembly 44. As shown, cavity blade 55 has complementary passages, one of which is passage 64*a* within which fits magnet 64. A cap plate 35 also has complementary magnet passages, such as cap plate passage 64*b* within which magnet 64 also fits within. The term "on and about" referring to the magnet mounting on the blade refers to this interlocking structure of the center plate and the intermediate blades and the cap plate. However, different mounting systems may be used other than explained herein to mount the magnets on the radially outboard blade segments of the blade plates and to mount the magnets about these radial segments.

Subassembly 42 has an end plate 39 (right-side plate 39). The opposing end of rotor 40 (left-side) has another end plate. Plates 33, 55, 37 and 39 are attached together to form subassembly 42. End plate 39 has six segmental magnet plates, three "same polarity" magnet plates 39*a* and three "opposite polarity" magnet plates 39*b*. Hence, rotor 40 has end caps 39 carrying 12 magnetic plates of alternating polarity.

FIG. 4B shows subassembly 42 as a unitary component of the APEG. Returning to FIG. 4A, subassembly 44 includes the same components except that centerplate 33 is common to both subassemblies 42, 44.

The three segmental magnet plates 39*a* in the end caps (see end cap 39) are positive in polarity and are identified with the holes in them. Each end cap has three positive polarity magnet plates 39*a*. These three positive polarity magnet plate segments 39*a* are placed in an alternate pattern with three segmental negative polarity plates 39*b* which are shown without holes and designed to work with off the shelf permanent magnets 60, 64. The holes in the three positive polarity magnet plate segments 39*a* allow the air pressure to be released and this air flow cools the stators and this air flow is drawn back into the adjacent bilateral turbine. The circular end cap plates 39 are transversely outboard of each rotor subassembly 42, 44. Each end cap plate has alternating wedges of positive and negative magnetic plates 39*a*, 39*b*, and the alternating wedges of positive and negative magnetic plates are magnetic alignment with blade carried magnets.

The cap plates (see cap plate 35) are used to encase the cavity blade plates 55, 57 and have holes or passages 37 which line up with the magnets 60, 64 on the center plate 33. The cap plates have holes to hold the six magnets extending laterally from the left and right opposing surfaces of center plate 33.

FIG. 4B diagrammatically illustrates the rotor assembly consisting of roto subassemblies 42, 44 fixedly mounted on common axle 9. Since the bi-lateral turbines are also fixedly mounted in axle 9, the axle is sometimes referred to herein as drive shaft 9.

An example of how the rotor assembly of two rotors that are mounted upon a common drive shaft is shown in FIG. 3. Each cavity carrying rotor blade has three cavities such that the offset of one cavity blade is at 60° offset the next cavity blade, thereby creating six air driven cavities, when being rotated by the air stream from the nozzle 15, one blade cavity alternates to the next blade cavity in a manner to ensure that the air pressure occurs at regular intervals pushing the rotor assembly FIG. 4B in a 360° revolution and while maintaining a balanced rotor assembly (FIG. 4B) on the drive shaft 9.

FIG. 3 also showing firing-order. The rotor assembly 42, 44 (FIG. 4B; see also rotor assembly 40 in FIG. 2) acts as a flywheel as the major amount of weight is on the outer circumference of the rotor assembly. The inertia of the flywheel is used to counterbalance the turbines shown in FIG. 5.

A flywheel is a mechanical device specifically designed to efficiently store rotational energy (kinetic energy). Flywheels resist changes in rotational speed by their moment of inertia. The amount of energy stored in a flywheel is proportional to the square of its rotational speed and its mass. Control of the speed and power output of rotor assembly 42, 44 is effected by variation of an automatic electronic management system (throttle controller or an automatic governor) known in the art as butterfly valves are employed to vary the amount of air injected into the rotor chamber sustaining the correct amount of air needed to maintain constant RPM (revolution per minute). A pressure release valve is also incorporated in the two manifolds.

FIG. 7 is a front cutaway view and shows upper and lower venturi nozzles 15, 17, wherein nozzle 15 is feeding air into cavity 81 of the rotor assembly. Valve 82 is the air flow control for the automatic electronic management system (throttle controller or an automatic governor). For example, a butterfly valve may be employed to vary the amount of air injected into the rotor chamber sustaining the correct amount of air needed to maintain constant RPM. As explained earlier, the air pressure feed to rotor assembly 42, 44 is increased because the rotor cavities 81 are offset by 60° in the assembly 42, 44 which means half the nozzle is opened alternately on each rotor, e.g., the top nozzle is open, and the bottom nozzle is closed on rotor blade 55, while the adjacent rotor blade 57 (see FIG. 3) closes the top nozzle and the bottom nozzle is open to the presented cavity of rotor blade 57.

Figure 6:
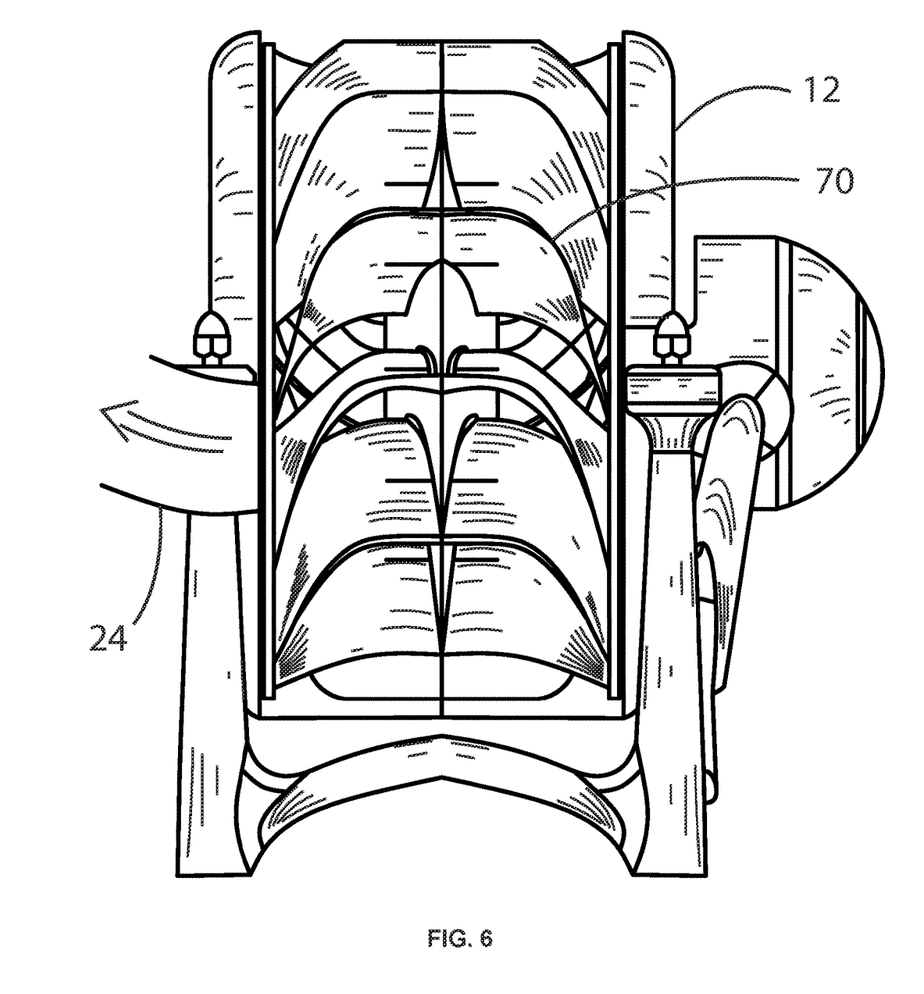
FIG. 6 diagrammatically illustrates a portion of one centrifugal air turbine.

FIG. 6 shows one turbine of the two bi-lateral turbines which uses the dynamic air pressure created by the rotor motion to increase the static air pressure inside the shroud 12 of the intake turbine manifold 24 thus allowing a greater flow through the APEG generator and hence increasing the generator's revolutions per minute which forces the high pressure airflow into the air transfer manifolds 24, 26 (FIG. 2) with venturi nozzles 15, 17 (FIG. 7) onto the rotor assembly. FIG. 6 shows a scoop shaped turbine blade 70 which forces air into the inlet of manifold 24 leading to upper nozzle 15.

Figure 8:
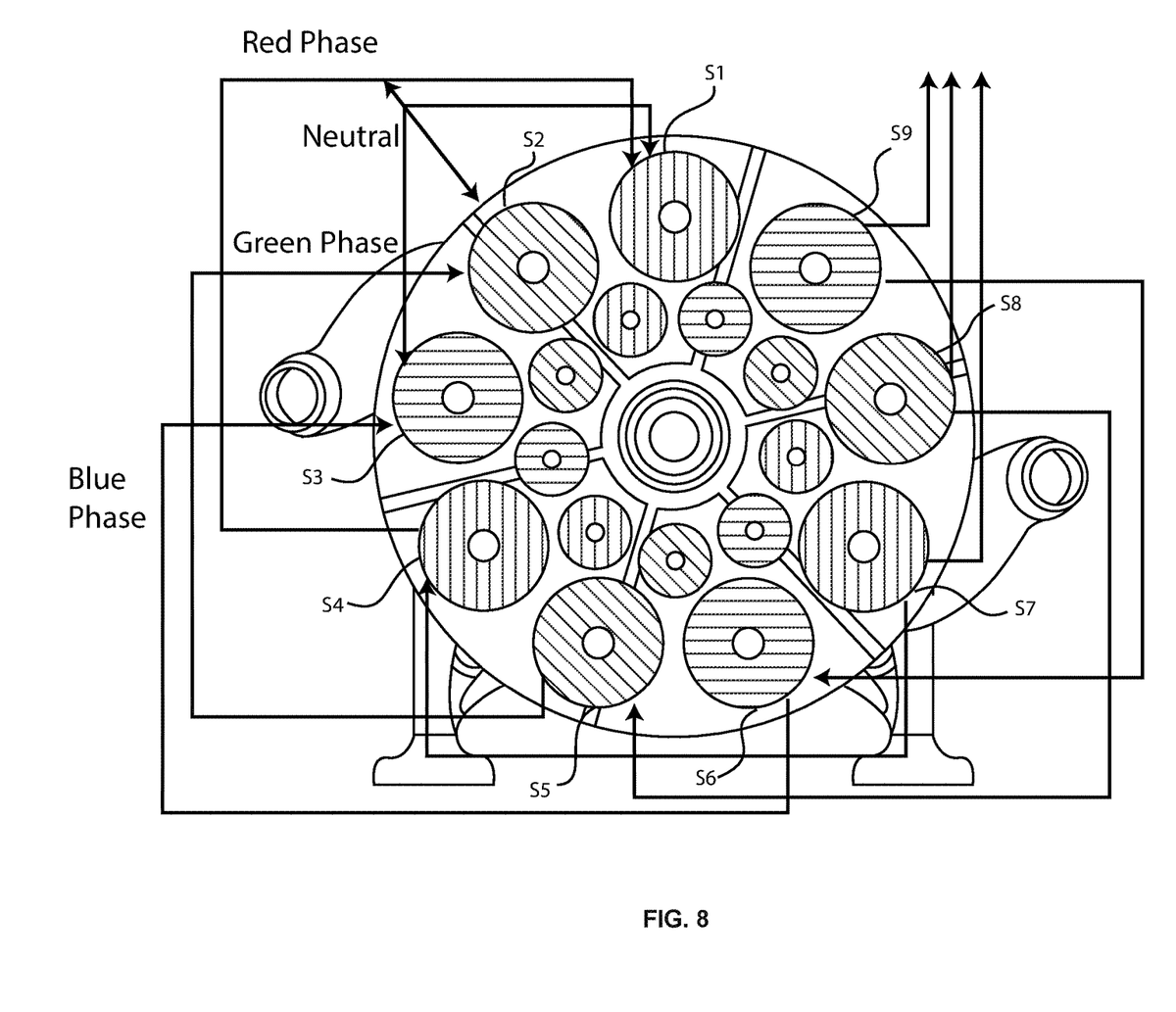
FIG. 8 diagrammatically illustrates the stator layout, each stator coil (S1-S9) transversely positioned on a fixed circular plate (fixed to the APEG power stand, not to the rotor axle).

FIG. 8 diagrammatically illustrates an electrical connection plan for the APEG. The negative terminal of stator coil S9 is electrically connected to the positive end of coil S6. The stator coils may be flat copper air coil or other common stator elements. For a three phase system, stators are connected together as known in the prior art. The phases are color coded in the Figure: red phase is S1, S4 and S7; green phase is S2, S5 and S8; and blue phase is S3, S6 and S9. The magnets are also color coded for matching phases. Black is the neutral conductor.

Figure 9:
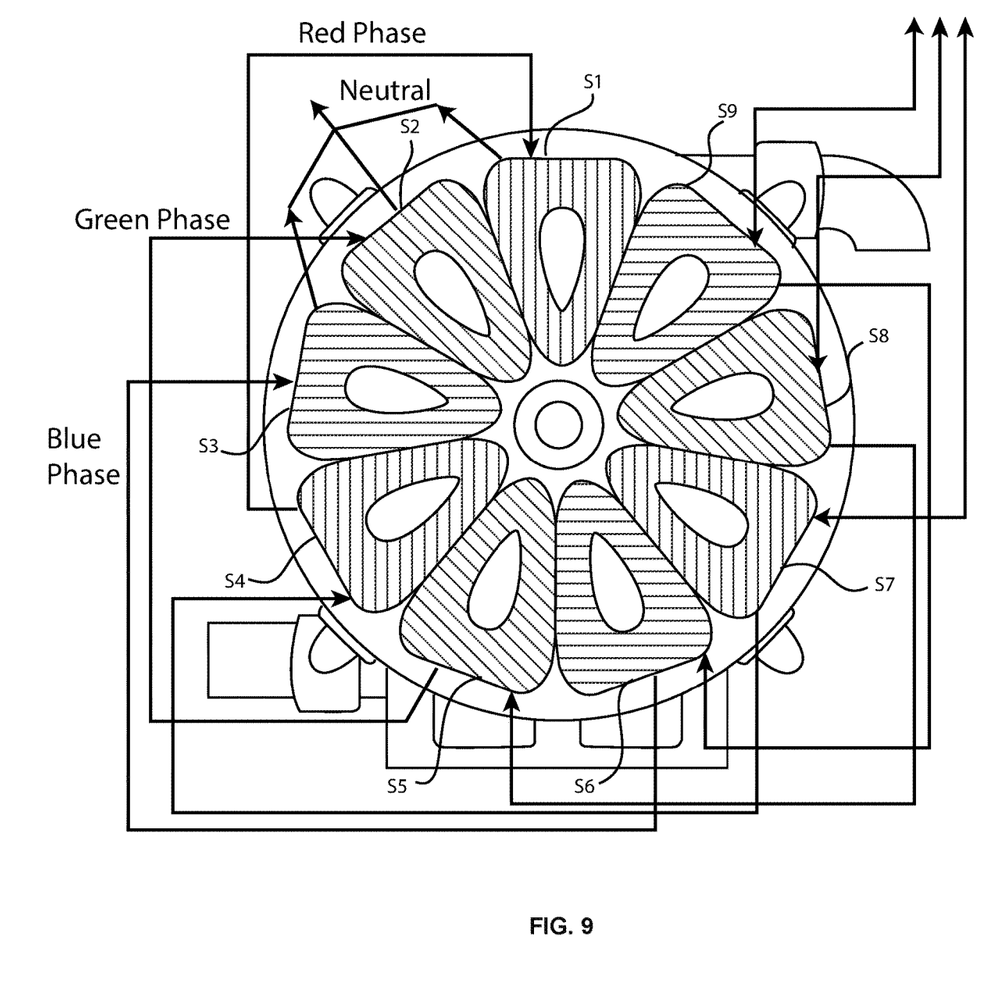
FIG. 9 diagrammatically illustrates another layout of the stator coils (S1-S9).

FIG. 9 shows a different three phase system. The stators are connected together as known in the prior art. The phases are color coded in the Figure: red phase is S1, S4 and S7; green phase is S2, S5 and S8; and blue phase is S3, S6 and S9. The magnets are also color coded for matching phases. Black is the neutral conductor.

The claims appended hereto are meant to cover modifications and changed within the scope and spirit of the present invention.

What is claimed is:

1. An air powered electrical generator (APEG) comprising:
   a rotating axle upon which is mounted bilateral air turbines on opposite sides of an APEG centerline normal to the axle;
   at least two rotor subassemblies mounted on the axle inboard of the bilateral turbines;
   each rotor subassembly having at least two cavity carrying circular blade plates mounted adjacent each other;
   a plurality of cavities formed in each blade plate, each cavity having a substantially scalene triangular shape formed by a longer air impact leading edge and a shorter trailing edge and an air portal open at a periphery of the blade plate;
   each blade plate in each rotor subassembly offset to another blade plate of the at least two blade plates such that at least one air portal is present about the periphery of the mounted blade plates during rotation of the rotor subassemblies on the axle;
   each turbine having a shroud and turbine blades generating compressed air flow into a manifold;
   at least one venturi nozzle mounted at both manifold outputs channeling the compressed air flow into presented air portal;
   each rotor subassembly carrying a plurality of permanent magnets on and about radially outboard blade segments of the blade plates;
   at least two bilateral stationary stators transversely fixedly mounted separate and apart from the rotating axle outboard of the rotating rotor subassemblies; and
   electrical outputs electrically coupled to the stators carrying APEG generated electric power from the stators when the rotor subassemblies rotate with respect to the stationary stators.

2. The air powered electrical generator (APEG) as claimed in claim 1 wherein an intersection of the leading edge of the cavity forms a substantially acute angle to the trailing edge and a hypotenuse of the triangular shape radially inboard of a blade periphery.

3. The air powered electrical generator (APEG) as claimed in claim 2 wherein the substantially triangular cavities extend radially inboard of the magnets on and about the radially outboard blade segments of the blade plates, thereby forming a flywheel.

4. The air powered electrical generator (APEG) as claimed in claim 3 wherein the at least two rotor subassemblies form a rotor assembly with an intermediate circular center plate mounted on the axle, the center plate carrying the magnets and the magnets transversely extending through passages in each blade plate on the radially outboard blade segments.

5. The air powered electrical generator (APEG) as claimed in claim 4 including circular end cap plates transversely outboard each of the rotor subassemblies, each end cap plate having alternating wedges of positive and negative magnetic plates, the alternating wedges of positive and negative magnetic plates in magnetic alignment with blade carried magnets.

6. The air powered electrical generator (APEG) as claimed in claim 5 wherein each turbine shroud has a first upper flow manifold and a second lower flow manifold, said at least one venturi nozzle is an upper nozzle fed with compressed air from the upper flow manifold of the bilateral turbines, and the lower flow manifold feeds compressed air from the lower flow manifold to a lower venturi nozzle, such that the presented air portal for one blade plate is open to the upper nozzle simultaneously with the presented air portal for other blade plate being open to the lower nozzle.

7. The air powered electrical generator (APEG) as claimed in claim 6 including an air starter pump feeding starting compressed air into the venturi nozzle.

8. The air powered electrical generator (APEG) as claimed in claim 1 wherein the substantially triangular cavities extend radially inboard of the magnets on and about the radially outboard blade segments of the blade plates, thereby forming a flywheel.

9. The air powered electrical generator (APEG) as claimed in claim 8 wherein the at least two rotor subassemblies form a rotor assembly with an intermediate circular center plate mounted on the axle, the center plate carrying the magnets and the magnets transversely extending through passages in each blade plate on the radially outboard blade segments.

10. The air powered electrical generator (APEG) as claimed in claim 9 including circular end cap plates transversely outboard each of the rotor subassemblies, each end cap plate having alternating wedges of positive and negative magnetic plates, the alternating wedges of positive and negative magnetic plates in magnetic alignment with blade carried magnets.

11. The air powered electrical generator (APEG) as claimed in claim 1 wherein each turbine shroud has a first upper flow manifold and a second lower flow manifold, said at least one venturi nozzle is an upper nozzle fed with compressed air from the upper flow manifold of the bilateral turbines, and the lower flow manifold feeds compressed air from the lower flow manifold to a lower venturi nozzle, such that the presented air portal for one blade plate is open to the upper nozzle simultaneously with the presented air portal for other blade plate being open to the lower nozzle.

12. The air powered electrical generator (APEG) as claimed in claim 1 including an air starter pump feeding starting compressed air into the venturi nozzle.

\* \* \* \* \*